(12) United States Patent
Devenyi et al.

(10) Patent No.: US 7,191,674 B1
(45) Date of Patent: Mar. 20, 2007

(54) STEPPER MECHANICAL DRIVE SYSTEM

(75) Inventors: Gabor Devenyi, Penetanguishene (CA); Kevin Wagner, Victoria Harbour (CA)

(73) Assignee: Raytheon Company, Lexington, MA (US)

( * ) Notice: Subject to any disclaimer, the term of this patent is extended or adjusted under 35 U.S.C. 154(b) by 475 days.

(21) Appl. No.: 10/464,222

(22) Filed: Jun. 18, 2003

(51) Int. Cl.
*F16H 27/02* (2006.01)

(52) U.S. Cl. ............................................. 74/110
(58) Field of Classification Search ............. 74/88, 74/110, 126, 128, 129, 130, 131, 132, 134, 74/135
See application file for complete search history.

(56) References Cited

U.S. PATENT DOCUMENTS 5,959,376 A * 9/1999 Allen ................. 310/40 MM
6,307,285 B1 * 10/2001 Delson et al. ............... 310/14
6,349,605 B1 * 2/2002 Harju ........................ 74/165

* cited by examiner

*Primary Examiner*—Vicky A. Johnson
(74) *Attorney, Agent, or Firm*—Leonard A. Alkov; Rene Grossman; H. Saint Julian

(57) ABSTRACT

A stepper mechanical drive system includes a carriage, a support for the carriage that permits the carriage to move bidirectionally along a travel direction, and a follower structure on the carriage, The follower structure has two ramp structures that each extends longitudinally along the travel direction of the carriage and includes a plurality of sawtooth ramp faces. An actuator structure is not on the carriage and is stationary relative to the travel direction of the carriage. The actuator structure has a pair of actuators, and each actuator includes an actuator arm having an actuator element thereon, wherein the actuator arm is movable so that the actuator element may be controllably contacted to at least one of the ramp structures, and a controllable actuator drive operable to move the actuator arm. Each actuator drive may also include a disengageable latch that disengagably retains the actuator arm in a selected position.

22 Claims, 2 Drawing Sheets

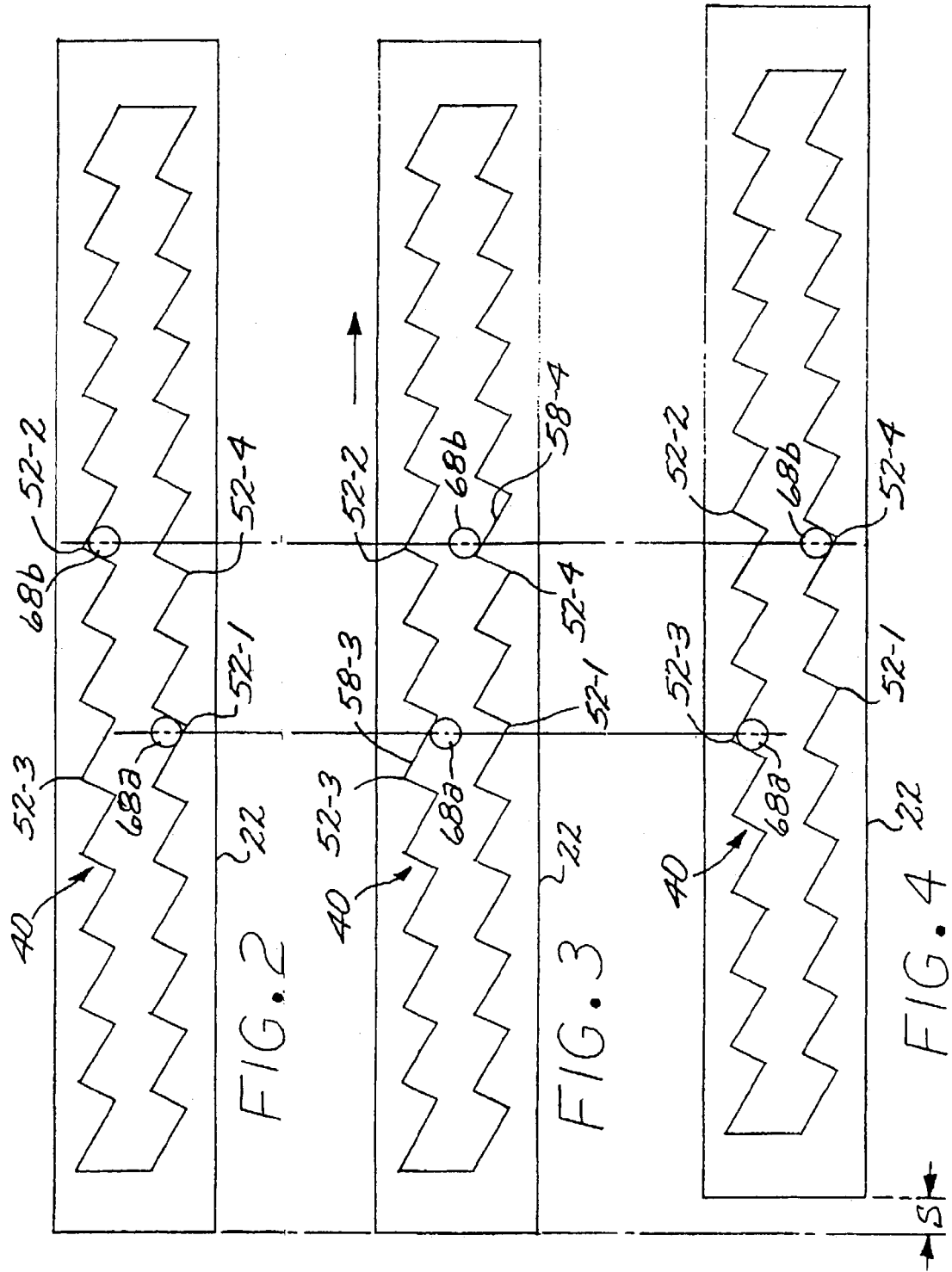

STEPPER MECHANICAL DRIVE SYSTEM

This invention relates to a mechanical drive system and, more particularly, to a mechanical drive system where a driven carriage is stepped between discrete locations along a travel direction.

BACKGROUND OF THE INVENTION

Some mechanical systems require that one or more functional elements be physically moved along a travel direction. In one common approach, the functional elements are mounted on a carriage that is driven by a motor. To convert the rotary output of the motor to the linear motion required for the functional elements, a leadscrew is driven by a rotary-output motor, a follower on the carriage engages the threads on the leadscrew, and the carriage and functional elements move linearly as the motor shaft turns.

Leadscrew and other drives are widely and successfully used for many applications. In others, however, they have shortcomings. One is that the positioning of the functional element is not always precisely repeatable. That is, the position of the follower and the functional element may be infinitely varied, so that the position of the functional element may be slightly different with each repositioning. Another problem is that, when the mechanical system is mechanically shocked or severely shaken, the position of the functional element may be disturbed from its desired position. The feedback controller of the leadscrew mechanical drive may be able to compensate for this undesired movement. If the drive motor and/or the feedback controller are not operable, as for example when they are intentionally or unintentionally shut down, there is no capability for compensation, and the disturbance to the position of the functional element is not corrected. Yet another shortcoming in some applications is that the physical envelope of the leadscrew drive system is elongated to allow for the in-line coupling of the motor and the leadscrew. This elongated physical envelope may be unacceptable for some applications. It is difficult to miniaturize the leadscrew mechanical drive system in some instances. Yet another shortcoming is that the alignment of leadscrew mechanical drives is difficult to establish initially and to maintain throughout the service life, particularly where the required range of travel of the functional elements is large and therefore the leadscrew is long.

There is a need for a mechanical drive system that overcomes these shortcomings. The present invention fulfills this need, and further provides related advantages.

SUMMARY OF THE INVENTION

The present approach provides a mechanical drive system that repeatably positions functional elements precisely at the same position. In one embodiment, the positioning is reliably retained when the drives and sensors are unpowered. Consequently, the positioning of the mechanical drive, and thence the functional elements, is precisely retained against shocks and vibration, even when the system is unpowered. The physical envelope of the present stepper mechanical drive system is much shorter than that of the leadscrew drive system, for comparable ranges of travel of the functional elements. Miniaturization of the present approach is relatively straightforward and easy to accomplish. The alignment of the present stepper mechanical drive system is easily achieved initially and maintained during service, largely independent of the required range of travel of the functional elements.

In accordance with the invention, a stepper mechanical drive system comprises a carriage, and a stationary structure including a support for the carriage. The support permits the carriage to move bidirectionally relative to the support along a travel direction. A follower structure is on a first one of the stationary structure and the carriage. The follower structure comprises two ramp structures, and each of the ramp structures extends longitudinally along the travel direction of the carriage and comprises a plurality of sawtooth ramp faces. An actuator structure is on a second one (different from the first one) of the stationary structure and the carriage. In a preferred embodiment, the actuator structure is on the stationary structure and the follower structure is on the carriage, but these placements may be reversed. The actuator structure comprises a pair of actuators. Each actuator in turn comprises an actuator arm having an actuator element thereon. The actuator arm is movable so that the actuator element may be controllably contacted to at least one of the ramp structures, and a controllable actuator drive is operable to move the actuator arm.

In this configuration, the low point of each ramp structure is a stable position to which the actuator element is driven by the actuator drive. The actuator element moves along the inclined surface of the sawtooth ramp faces as the actuator drive forces the actuator element toward the stable position, thereby moving the carriage in a direction different from that of the movement of the actuator element, and typically perpendicular to the movement of the actuator element. By a combination of movements of the two actuators, the carriage is stepwise moved in either direction.

Typically, a plurality of functional elements are mounted to the carriage. In an application of interest, the functional elements are light filters used in an optical fiber communications system.

In one embodiment, the carriage and the support cooperate such that the travel direction is a straight line. However, the travel direction may instead be curved or angled.

Desirably, the carriage has a slot extending parallel to the travel direction and has opposing slot sides, and the ramp structures are on the slot sides in facing relation to each other. The ramp structures may instead be on the outside surfaces of the carriage. Typically, the ramp structures are longitudinally staggered with respect to each other along the travel direction.

The ramp faces of the sawtooth are preferably flat surfaces, but they may be curved or compound surfaces with two different flat surfaces, for example. The ramp faces may be symmetric with respect to each other, but also may be asymmetric to vary the lengths of the discrete steps between the stable positions of the structure. That is, each ramp structure may include a first ramp face having a longitudinal first-ramp projection length on the travel direction, and a second ramp face having a longitudinal second-ramp projection length on the travel direction, wherein the second-ramp projection length is different from the first-ramp projection length. Preferably, each ramp structure includes a first ramp face and a second ramp face, and at least one of the first ramp face and the second ramp face lies at an angle of from about 20 to about 70 degrees to the travel direction.

In one important and preferred embodiment, each actuator drive has a disengageable latch that disengagably retains the actuator arm in a selected position. For example, each actuator drive may comprise a first permanent magnet, a second permanent magnet that is facing but spaced apart from the first permanent magnet, and an electromagnet disposed between the first permanent magnet and the second permanent magnet and movable between a facing contact with the first permanent magnet and facing contact with the second permanent magnet. The actuator arm is connected to the electromagnet so as to be movable with the electromagnet. Desirably, there is additionally a ferromagnetic structure having a first-ferromagnetic-structure face in facing relation to the first-permanent-magnet face, and a second-ferromagnetic-structure face in facing relation to the second-permanent-magnet face. This disengageable latch is dimensioned so that the electromagnet is releasably retained against one of the permanent magnets when the actuator element is in its low point or stable position relative to the ramp structure. If power is lost, this position is maintained by the permanent magnet. To release the retention and move the actuator element away from the stable position, the electromagnet is actuated to push the electromagnet away from the permanent magnet.

Thus, in a preferred form, a stepper mechanical drive system comprises a carriage comprising a slot extending parallel to a travel direction and having opposing slot sides, a support for the carriage that permits the carriage to move bidirectionally along the travel direction, and a follower structure on the carriage. The follower structure comprises two ramp structures on the slot sides in facing relation to each other. Each of the ramp structures extends longitudinally along the travel direction of the carriage and comprises a plurality of longitudinally continuous sawtooth ramp faces. Each ramp structure includes a first ramp face and a second ramp face, wherein at least one of the first ramp face and the second ramp face lies at an angle of from about 20 to about 70 degrees to the travel direction. An actuator structure is not on the carriage and is stationary relative to the travel direction of the carriage. The actuator structure comprises a pair of actuators. Each actuator comprises an actuator arm having an actuator element thereon, and the actuator arm is movable so that actuator element may be controllably contacted to at least one of the ramp structures. A controllable actuator drive is operable to move the actuator arm. Each actuator drive comprises a first permanent magnet having a first-permanent-magnet face, a second permanent magnet having a second-permanent-magnet face that is in facing but spaced apart relation to the first-permanent-magnet face, and an electromagnet disposed between the first permanent magnet and the second permanent magnet and movable between a facing contact with the first permanent magnet and the second permanent magnet. The actuator arm is connected to the electromagnet so as to be movable with the electromagnet. A ferromagnetic structure has a first-ferromagnetic-structure face in facing relation to the first-permanent-magnet face, and a second-ferromagnetic-structure face in facing relation to the second-permanent-magnet face. Other operable features discussed herein may be used in conjunction with this embodiment.

The present approach thus provides a stepper mechanical drive system that produces a precisely repeatable positioning of the function element(s). This repeatable position is maintained under conditions of shock and vibration when the power is on and, in the preferred embodiment, when the system is unpowered. Because there is no elongated leadscrew driving the carriage, alignment is simplified as compared with conventional leadscrew drives. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 2–4 are schematic sequential views of the mode of operation of the stepper mechanical drive system as the carriage is moved by one step.

DETAILED DESCRIPTION OF THE INVENTION

Figure 1:
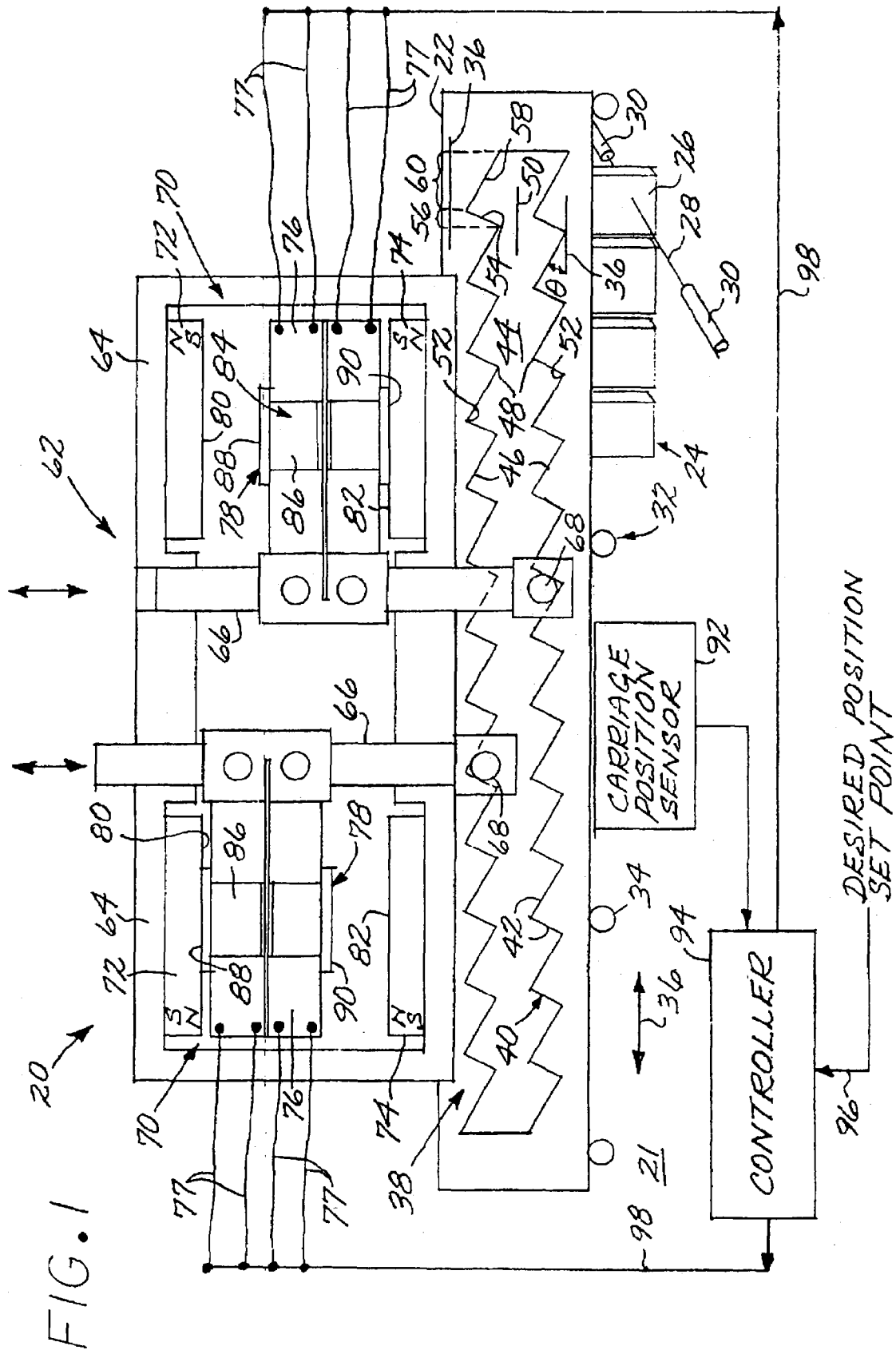
FIG. 1 is a schematic view of a stepper mechanical drive system.

FIG. 1 depicts a stepper mechanical drive system 20. The stepper mechanical drive system 20 comprises a stationary structure 21 that supports a carriage 22 and a plurality of functional elements 24 mounted to the carriage 22. In an application of interest, the functional elements 24 are a plurality of optical filters 26 in an optical fiber communication system. The carriage 22 controllably moves the individual optical filters 26 into and out of a light beam 28 extending between two optical collimators 30 and positioned so that it passes through one of the properly positioned optical filters 26. In this application, the carriage 22 moves in discrete, precisely reproducible increments so that the light beam 28 is centered on the particular optical filter 26. Upon reaching the discrete position corresponding to that centered location, it is preferred that the carriage 22 be positively retained in that position against mechanical shocks and vibrations, whether the power to the stepper mechanical drive system 20 is on or off, until that optical filter 26 is to be removed from the light beam 28 and possibly replaced by another of the optical filters 26.

The carriage 22 is supported from the support structure 21 by a support 32, illustrated as a bearing set 34, so that the carriage 22 may move relative to the support structure 21 bidirectionally along a travel direction 36 to controllably position the optical filters 26. Carriages 22 and highly efficient bearing sets 34 are available commercially, so that the force required to move the carriage in the travel direction 36 is quite small. In the illustration, the travel direction 36 is a straight line, but it may be a curved or a segmented line.

A follower structure 38 is on the movable carriage 22 in the illustrated embodiment, although in other embodiments the follower structure may be stationary and part of the support structure and the actuator structure, discussed subsequently, may be mounted on the movable carriage. The illustrated follower structure 38 includes two ramp structures 40. Each of the ramp structures 40 extends longitudinally along the travel direction 36 of the carriage 22 and comprises a plurality of sawtooth ramp faces 42. In the illustrated embodiment, the carriage 22 has a slot 44 extending parallel to the travel direction 36 and having opposing slot sides 46. The ramp structures 40 are on and define the slot sides 46, and are in facing relation to each other. The ramp structures 40 need not be on the sides of the slot 44, and instead may be on the lateral sides of the carriage 22 or elsewhere.

Each of these slot-type ramp structure 42 may be described as having a peak 48 (closest to a transverse centerline 50 extending parallel to the travel direction 36 of the slot 44) and a valley 52 (furthest from the transverse centerline 50). The peaks 48 and valleys 52 on the opposite ramp structures may be aligned with each other along the travel direction 36 or staggered longitudinally with respect to each other along the travel direction 36 (as illustrated). Each ramp structure 40 includes a first ramp face 54 having a longitudinal first-ramp projection length 56 on the travel direction 36, and a second ramp face 58 having a longitudinal second-ramp projection length 60 on the travel direction 36. The second-ramp projection length 60 may be the same as, or different from (as illustrated), the first-ramp projection length 56. The ramp faces 54 and 58 may each be a single plane, as illustrated, or a multi-faceted surface, or a curved surface. However, it is preferred that at least one of the first ramp face 54 and the second ramp face 58 lies at an angle θ of from about 20 to about 70 degrees to the travel direction 36. If one (or both) of the ramp faces 54 and 58 is not within this angular range, the stepper mechanical drive system 20 may still be operable, but the proper inclined-plane mechanical interaction with the actuator element, to be discussed subsequently, is difficult to achieve, because the ramp face is too shallowly or too steeply inclined to the travel direction 36. As the angles θ become less than about 10 or more than about 80 degrees, the stepper mechanical drive system 36 becomes virtually inoperable.

The stepper mechanical drive system 20 includes an actuator structure 62 that is stationary relative to the travel direction 36 of the carriage 22 in the illustrated embodiment, and is therefore not on the carriage 22. The actuator structure 62 comprises a pair of substantially identical actuators 64. Each actuator 64 includes an actuator arm 66 having an actuator element 68 thereon. The actuator element 68 is preferably either a pin or a roller that contacts one of the inclined ramp faces 54 or 58 and rides thereon. The actuator arm 66 is movable so that the actuator element 68 may be controllably contacted to at least one of the ramp structures 40 to push against it so that a resolved component of the force exerted by the actuator element 68 pushes the carriage 22 in the direction parallel to the travel direction 36.

A controllable actuator drive 70 is operable to move the actuator arm 66 between locations whereat the actuator element 68 does not contact the ramp structure 40, and where it does contact the ramp structure 40 with selectable amounts of force. In a preferred form illustrated in FIG. 1, each actuator drive includes a first permanent magnet 72 and a second permanent magnet 74 that is facing, but spaced apart, from the first permanent magnet 72. An electromagnet 76 is disposed between the first permanent magnet 72 and the second permanent magnet 74 and movable between a facing contact with the first permanent magnet 72 and a facing contact with the second permanent magnet 74. As illustrated, the actuator arm 66 of each actuator 64 is affixed to and connected to the respective electromagnet 76, either rigidly or constrained pivotably, so as to be movable with the electromagnet 76. That is, when the electromagnet 76 of each of the actuator drives 70 is driven by an applied electrical voltage (applied through leads 77 independently of the other actuator 64), it will be attracted toward and move toward the first permanent magnet 72 or the second permanent magnet 74, depending upon the polarity of the applied voltage. The respective actuator arm 66 and its actuator element 68 will accordingly move toward to contact, or away from, a selectable one of the ramp structures 40.

It is preferred that each actuator drive 70 further include a disengageable latch 78 that disengagably retains the actuator arm 66 in a selected position, and thereafter may be controllably disengaged from that retained configuration. The preferred disengageable latch 78 retains the actuator element 68 in contact with, or separated from, a selected one of the ramp structures 40 when a voltage is not applied to the respective actuator drive 70. In a preferred form illustrated in FIG. 1, the first permanent magnet 72 has a first-permanent-magnet face 80, and the second permanent magnet 74 has a second-permanent-magnet face 82. The disengageable latch 78 includes a ferromagnetic structure 84, in this case in the form of a ferromagnetic core 86 extending through the center of the electromagnet 76. The ferromagnetic core 86 functions both as part of the disengageable latch 78 and also to intensify the magnetic field of the electromagnet 76. The ferromagnetic structure 84 includes a first-ferromagnetic-structure face 88 in facing relation to the first-permanent-magnet face 80, and a second-ferromagnetic-structure face 90 in facing relation to the second-permanent-magnet face 82.

The latching occurs when the electromagnet 76 is activated to drive one of the ferromagnetic-structure faces 88 or 90 into contact with the corresponding permanent-magnet faces 80 and 82. If the voltage remains applied to the electromagnet 76, the ferromagnetic-structure face 88 or 90 remains in contact with the corresponding permanent-magnet faces 80 or 82 due to the force generated by the electromagnet 76. If the voltage is removed from the electromagnet 76, the ferromagnetic-structure face 88, 90 remains in contact with the corresponding permanent-magnet faces 80 and 82 due to the permanent magnetic force between the contacting faces 80, 88 or 82, 90. The electromagnet 76 is sized such that it generates sufficient force to separate and push apart the contacting faces 80, 88 or 82, 90 when the polarity of the voltage applied to the electromagnet 76 is reversed.

In operation, the position of the carriage 22 relative to the stationary structure 21 along the travel direction 36 is either known from step counts or is measured by a carriage position sensor 92 and provided to a controller 94. A desired position set point 96 is also provided to the controller 94. The controller 94 provides voltage command signals 98 of the appropriate sign and magnitude to the actuator structure 62 to drive the carriage 22 to the desired position along the travel direction 36, according to the principles discussed next. (In FIG. 1, the lines for the voltage command signals 98 are shown schematically and without indicating all of the individual wires that are connected to the leads 77, to avoid clutter in the drawing.)

FIGS. 2–4 illustrate the sequence of steps in moving and disengagably latching the carriage 22. In these figures, only the actuator elements 68a (left-hand actuator element) and 68b (right-hand actuator element), the carriage 22, and the ramp structure 40, are shown to avoid clutter in the drawing, but it is understood that the remainder of the actuator structure 62 and other physical structure are present and operating in the manner discussed above.

In FIG. 2, the actuator element 68a is releasably latched against the valley 52-1 of the ramp structure 40, and the actuator element 68b is releasably latched against the valley 52-2 on the opposite side of the ramp structure 40. As shown in FIG. 3, to achieve a movement of the carriage 22, the electromagnet driving the actuator element 68a is activated to release its latching and drive the actuator element 68a to the opposite side of the ramp structure 40 with full power applied to the electromagnet; and simultaneously the electromagnet driving the actuator element 68b is activated to release its latching and drive the actuator element 68b to the opposite side of the ramp structure 40 with only partial power, typically only 25–50 percent of its full power, applied to the electromagnet. The actuator element 68a contacts the ramp face 58-3, and pushes the carriage 22 to the right as the actuator element 68a rolls or slides down the ramp face 58-3 to the valley 52-3, while the actuator element 68b contacts the ramp 58-4 with insufficient force to resist this rightward motion. As the carriage 22 moves to the right by a step amount S and reaches the position shown in FIG. 4, the actuator element 68a reaches the valley 52-3 and is releasably latched into that position, and the actuator element 68*b* reaches the valley 52-4 and is releasably latched into that position. The carriage 22 is thereafter releasably retained in the position shown in FIG. 4, whether the electromagnets are powered or not, until power is applied to release the latches.

To perform another step to move the carriage 22 to the right from the position shown in FIG. 4, the process is repeated, except that full power is applied to the actuator element 68*b* and only partial power is applied to the actuator element 68*a* when they reach the opposite sides of the ramp structure 40. To instead perform a step to move the carriage 22 the left from the position shown in FIG. 4, the process is repeated, with full power applied to the actuator element 68*a* and partial power applied to the actuator element 68*b* when they reach the opposite sides of the ramp structure 40. The carriage 22 may thus be stepped in precisely defined, discrete increments S in either direction along the travel direction 36. The final position of the carriage 22 may be determined either by counting the number of steps in either direction or by the measurements of the carriage position sensor 92, or by both techniques.

The stepper mechanical drive as shown in FIG. 1 has been constructed and operated according to the principles illustrated in FIGS. 2–4, and has been found fully operable.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A stepper mechanical drive system comprising:
    a carriage;
    at least one functional element mounted to the carriage;
    a stationary structure including a support for the carriage, the support permitting the carriage to move bidirectionally relative to the support along a travel direction;
    a follower structure on a first one of the stationary structure and the carriage, wherein the follower structure comprises two ramp structures, wherein each of the ramp structures extends longitudinally along the travel direction of the carriage and comprises a plurality of sawtooth ramp faces, and wherein the ramp faces lie at an angle of from about 10 to about 80 degrees to the travel direction; and
    an actuator structure on a second one of the stationary structure and the carriage, wherein the actuator structure comprises a pair of actuators, and wherein each actuator comprises
        an actuator arm having an actuator element thereon, wherein the actuator arm is movable so that the actuator element may be controllably contacted to at least one of the ramp structures, and
        a controllable actuator drive operable to move the actuator arm.

2. The drive system of claim 1, wherein the support comprises a bearing set upon which the carriage is supported.

3. The drive system of claim 1, wherein the carriage and the support cooperate such that the travel direction is a straight line.

4. The drive system of claim 1, wherein the carriage comprises a slot extending parallel to the travel direction and having opposing slot sides, and wherein the ramp structures are on the slot sides and are in facing relation to each other.

5. The drive system of claim 1, wherein the ramp structures are longitudinally staggered with respect to each other along the travel direction.

6. The drive system of claim 1, wherein each ramp structure includes
    a first ramp face having a longitudinal first-ramp projection length on the travel direction, and
    a second ramp face having a longitudinal second-ramp projection length on the travel direction, wherein the second-ramp projection length is different from the first-ramp projection length.

7. The drive system of claim 1, wherein at least one of the first ramp face and the second ramp face lies at an angle of from about 20 to about 70 degrees to the travel direction.

8. The drive system of claim 1, wherein each actuator element is selected from the group consisting of a pin and a roller.

9. The drive system of claim 1, wherein each actuator drive comprises
    a first permanent magnet,
    a second permanent magnet that is facing but spaced apart from the first permanent magnet, and
    an electromagnet disposed between the first permanent magnet and the second permanent magnet and movable between a facing contact with the first permanent magnet and a facing contact with the second permanent magnet, wherein the actuator arm is connected to the electromagnet so as to be movable with the electromagnet.

10. The drive system of claim 1, wherein each actor drive comprises a disengageable latch that disengagably retains the actuator arm in a selected position.

11. The drive system of claim 1, wherein each actuator drive comprises
    a first permanent magnet having a first-permanent-magnet face,
    a second permanent magnet having a second-permanent-magnet face that is in facing but spaced apart relation to the first-permanent-magnet face,
    an electromagnet disposed between the first permanent magnet and the second permanent magnet and movable between a facing contact with the first permanent magnet and the facing contact with second permanent magnet, wherein the actuator arm is connected to the electromagnet so as to be movable with the electromagnet, and
    a ferromagnetic structure having
        a first-ferromagnetic-structure face in facing relation to the first-permanent-magnet face, and
        a second-ferromagnetic-structure face in facing relation to the second-permanent-magnet face.

12. The drive system of claim 1, wherein the follower structure is on the carriage, and the actuator structure is on the stationary structure.

13. The drive system of claim 1, wherein each actuator drive comprises a disengageable latch that disengagably retains the actuator arm in a selected position.

14. A stepper mechanical drive system comprising:
    a carriage, wherein the carriage comprises a slot extending parallel to a travel direction and having opposing slot sides;
    a support for the carriage, the support permitting the carriage to move bidirectionally along the travel direction;
    a follower structure on the carriage, wherein the follower structure comprises two ramp structures on the slot sides in facing relation to each other, wherein each of the ramp structures extends longitudinally along the travel direction of the carriage and comprises a plurality of longitudinally continuous sawtooth ramp faces, wherein each ramp structure includes a first ramp face and a second ramp face, and wherein at least one of the first ramp face and the second ramp face lies at an angle of from about 20 to about 70 degrees to the travel direction; and an actuator structure that is not on the carriage and is stationary relative to the travel direction of the carriage, wherein the actuator structure comprises a pair of actuators, and wherein each actuator comprises an actuator arm having an actuator element thereon, wherein the actuator arm is movable so that the actuator element may be controllably contacted to at least one of the ramp structures, and a controllable actuator drive operable to move the actor arm, wherein each actuator drive comprises a first permanent magnet having a first-permanent-magnet face, a second permanent magnet having a second-permanent-magnet face that is in facing but spaced apart relation to the first-permanent-magnet-face, an electromagnet disposed between the first permanent magnet and the second permanent magnet and movable between a facing contact with the first permanent magnet and facing contact with the second permanent magnet, wherein the actuator arm is connected to the electromagnet so as to be movable with the electromagnet, and a ferromagnetic structure having a first-ferromagnetic-structure face in facing relation to the first-permanent-magnet face, and a second-ferromagnetic-structure face in facing relation to the second-permanent-magnet face.

15. The drive system of claim 14, further including a plurality of functional elements mounted to the carriage.

16. The drive system of claim 14, wherein the support comprises a bearing set upon which the carriage is supported.

17. The drive system of claim 14, wherein the carriage and the support cooperate such that the travel direction is a straight line.

18. The drive system of claim 14, wherein the ramp structures are longitudinally staggered with respect to each other along the travel direction.

19. The drive system of claim 14, wherein each ramp structure includes a first ramp face having a longitudinal first-ramp projection length on the travel direction, and a second ramp face having a longitudinal second-ramp projection length on the travel direction, wherein the second-ramp projection length is different from the first-ramp projection length.

20. The drive system of claim 14, wherein each actuator element is selected from the group consisting of a pin and a roller.

21. A stepper mechanical drive system comprising:

a carriage;

a stationary structure including a support for the carriage, the support permitting the carriage to move bidirectionally relative to the support along a travel direction;

a follower structure on a first one of the stationary structure and the carriage, wherein the follower structure comprises a first ramp structure and a second ramp structure, and wherein each of the ramp structures extends longitudinally along the travel direction of the carriage and comprises a plurality of sawtooth ramp faces;

an actuator structure on a second one of the stationary structure arm the carriage, wherein the actuator structure comprises a first actuator comprising a first actuator arm having a first actuator element thereon, wherein the first actuator arm is movable so that the first actuator element may be controllably contacted to at least one of the ramp structures, and a controllable first actuator drive operable to move the first actuator arm;

a second actuator comprising a second actuator arm having a second actuator element thereon, wherein the second actuator arm is movable so that the second actuator element may be controllably contacted to at least one of the ramp structures, and a controllable second actuator drive operable to move the second actuator arm; and a controller that drives the first actuator drive and the second actuator drive, wherein the controller, the first actuator drive, and the second actuator drive are operable together to drive the carriage in either direction along the travel direction.

22. The drive system of claim 21, wherein the first actuator drive comprises a disengageable latch that disengagably retains the actuator arm in a selected position.

* * * * *